United States Patent [19]
Miyama et al.

[11] Patent Number: 5,490,776
[45] Date of Patent: Feb. 13, 1996

[54] INDUSTRIAL FURNACE PROVIDED WITH ROTARY REGENERATIVE BURNER

[75] Inventors: Hiroshi Miyama; Tetsuhiko Ohki; Hitoshi Kaji; Yoshiyuki Yusa; Yasuo Hirose, all of Kanagawa, Japan

[73] Assignee: Chiyoda Corporation, Japan

[21] Appl. No.: 218,313

[22] Filed: Mar. 25, 1994

[30] Foreign Application Priority Data

Mar. 29, 1993 [JP] Japan .................................. 5-070400

[51] Int. Cl.$^6$ .................................................. F23D 11/44
[52] U.S. Cl. ........................ 431/215; 431/202; 431/159
[58] Field of Search .................................. 431/215, 202, 431/159, 11; 165/4, 8, 9.3, 9.4, 909

[56] References Cited

U.S. PATENT DOCUMENTS

| | | | |
|---|---|---|---|
| 3,077,926 | 2/1963 | Fikenschen | 165/7 |
| 5,147,200 | 9/1992 | Knöpfel et al. | 431/11 |
| 5,191,930 | 3/1993 | Chaney | 165/4 |

FOREIGN PATENT DOCUMENTS

0526172  2/1993  European Pat. Off. .

*Primary Examiner*—Larry Jones
*Attorney, Agent, or Firm*—Connolly & Hutz

[57] ABSTRACT

This invention aims to attain an industrial furnace which ensures uninterrupted operation of itself and protects accessorial devices thereof including a rotary regenerative burner against otherwise possible damage when the rotary regenerative burner suffers from a mechanical trouble, and possess high responsivity and high accuracy. This industrial furnace has an oxidizing agent passage (12) communicating with an oxidizing agent duct (33a) of a rotary regenerative burner (30), an exhaust gas passage (13) communicating with an exhaust gas duct (33b), a bypass (15) allowing intercommunication between the oxidizing agent passage (12) and the exhaust gas passage (13), and cut-off valves (16, 17) provided respectively in the bypass (15) and the exhaust gas passage (13), whereby the cut-off valve (16) on the bypass (15) side and the cut-off valve (17) on the exhaust gas passage (13) is controlled in response to a signal from burner.

20 Claims, 7 Drawing Sheets

INDUSTRIAL FURNACE PROVIDED WITH ROTARY REGENERATIVE BURNER

BACKGROUND OF THE INVENTION

1. Field of the Invention

This invention relates to an industrial furnace provided with rotary regenerative burners for utilizing the heat of the exhaust gas resulting from combustion for heating an oxidizing agent.

2. Description of the Prior Art

Such industrial furnaces as pipestill heater and iron and steel furnaces frequently adopt heat recovery type combustion devices adapted to utilize the heat of the exhaust gas resulting from combustion for heating an oxidizing agent.

Among these combustion devices is included that which is disclosed in Japanese published applications JP-A-1-222, 102 and JP-A-4-101,191, for example. This combustion device has attached to the wall of the combustion chamber of an industrial furnace a regenerator formed of a regenerative material and adapted to manifest perviousness to a gas and has a duct part communicating with this regenerator. This duct part has formed therein an oxidizing agent duct for passing an oxidizing agent and an exhaust gas duct for passing the exhaust gas resulting from combustion. Then, the oxidizing agent duct is provided therein with an oxidizing agent path for passing the oxidizing agent and the exhaust gas duct is provided therein with an exhaust gas path for passing the exhaust gas resulting from the combustion in the industrial furnace. The heating of the oxidizing agent is attained through the regenerator heated with the exhaust gas by rotating the regenerator and the duct part relative to each other.

The term "oxidizing agent" as used herein refers generally to oxygen atom-containing gases such as pure oxygen and nitrogen oxide and oxygen gas-containing mixed gases such as air and oxygen-enriched air.

This combustion device itself is designated as a rotary regenerative burner. Since it is adapted to heat the oxidizing agent while keeping the regenerator in rotation, it is simple in construction as compared with a combustion device which requires a heat exchanger for a heat recovery to be separately provided exclusively for the purpose of heating the oxidizing agent. It is quite effective in saving energy because it enables the oxidizing agent to be directly heated with the regenerator made of heat-resisting material such as ceramics which is heated with the hot exhaust gas.

Incidentally, this rotary regenerative burner accomplishes exchange of heat between the exhaust gas and the oxidizing agent by relatively rotating the regenerator or the duct part by means of the power such as of an electric motor or a pneumatic motor. It can no longer attain the exchange of heat when the rotation of the regenerator or the dust part is stopped. As a result, the exhaust gas which has an elevated temperature flows out through the same flow path of the regenerator. In the worst case, the escaping exhaust gas will possibly reach a temperature exceeding the heat-resisting limits of such parts as an induced-draft fan and a control valve which are disposed on the downstream side of the rotary regenerative burner and damage them quickly.

Further, in this industrial furnace, the combustion chamber is in a substantially closed state and the regenerator part alone is capable of releasing the exhaust gas out of the combustion chamber. In case of an accidental stop of the relative rotation mentioned above, therefore, the combustion can be continued as an emergency measure by using air at ambient temperature. Then, the rotary regenerative burner Works in the same way as any conventional burner and the exhaust gas is no longer aspirated by the rotary regenerative burner and the preheating of the oxidizing agent is no longer continued.

An effort to keep the amount of heat transfer constant while continuing the combustion with air at ambient temperature as an oxidizing agent, therefore, necessitates an increase in the amount of combustion proportionate to the amount of the oxidizing agent to be consumed for preheating.

When the amount of combustion is increased as described above, the amount of the exhaust gas is increased in direct proportion to this increase in the amount of combustion. Since the inner pressure of the furnace is suffered to increase unless the induced-draft fan is enlarged to increase its capacity, the introduction of the oxidizing agent is obtained only with difficulty. In the worst case, an accidental fire will possibly occur.

SUMMARY OF THE INVENTION

This invention has been developed for the solution of the problem encountered by the conventional technique as described above. The first object of this invention is to provide an industrial furnace with a rotary regenerative burner which, on having a mechanical trouble, enables the supply of an oxidizing agent to be continued by switching flow paths and ensures an uninterrupted operation of the industrial furnace.

The second object of this invention is to provide an industrial furnace with a rotary regenerative burner which, on having a mechanical trouble, ensures uninterrupted supply of an oxidizing agent at ambient temperature to the regenerator of the burner and infallibly prevents the burner itself and the induced-draft fan from sustaining damage.

The third object of this invention is to provide an industrial furnace with a rotary regenerative burner which, on having a mechanical trouble, attains detection of this trouble by means of temperature, magnitude of electric current, and revolution number and enables the industrial furnace to operate with high responsivity and high accuracy.

The fourth object of this invention is to provide an industrial furnace with a rotary regenerative burner which, even after having a mechanical trouble, ensures uninterrupted combustion, alleviates the burden on the normally operating burner, and maintains the heat generation pattern required by the fluid subjected to heating as well as before the mechanical trouble.

The fifth object of this invention is to provide an industrial furnace with a rotary regenerative burner which, even when a mechanical trouble of the burner occurs and the induced-draft fan consequently suffers from an increased burden, allows direct release of the exhaust gas through the exhaust gas outlet, alleviates the burden on the induced-draft fan, and exalts the flexibility of the industrial furnace.

To accomplish the objects described above, this invention provides an industrial furnace having disposed on the wall of a combustion chamber at least one rotary regenerative burner comprising a regenerator with gas permeability and a duct part communicating with the regenerator of each rotary regenerative burner and having formed therein an oxidizing agent duct for passing an oxidizing agent and an exhaust gas duct for passing the exhaust gas of each rotary regenerative burner resulting from combustion and heating the oxidizing agent with the heat of the exhaust gas through the regenerator while rotating the regenerator and the duct part relative to each other, which industrial furnace is characterized by being provided with a bypass allowing intercommunication between an oxidizing agent passage communicating with the oxidizing agent duct of the rotary regenerative burner and an exhaust gas passage communicating with the exhaust gas duct and switching cut-off valves disposed in the bypass and the exhaust gas passage.

The combustion chamber of the industrial furnace according to this invention is characterized by having disposed in the bypass a cut-off valve adapted to be in a totally closed state normally and in a fully opened state in response to an electrical, hydraulic, or optical signal from burner monitoring means for monitoring the operating state of the rotary regenerative burner and disposed in the exhaust gas passage a cut-off valve adapted to remain in a totally opened state normally and a totally closed state in response to the signal mentioned above.

The oxidizing agent passage of the industrial furnace according to this invention is characterized by being connected to a forced-draft fan for controlling the flow of the oxidizing agent by means of a damper and the opening degree of the damper so that the indicated value of the oxygen concentration in the combustion chamber will remain at a set level.

The combustion chamber of the industrial furnace according to this invention is characterized by being provided with a plurality of rotary regenerative burners, oxidizing agent header parts connected to a suitable number of divisions of the oxidizing agent passages connected respectively to the rotary regenerative burners for collective supply of an oxidizing agent to the rotary regenerative burners, exhaust gas headers connected to a suitable number of divisions of the exhaust gas passages for discharging the exhaust gas departing from the rotary regenerative burners, bypasses allowing intercommunication between the oxidizing agent header parts and the exhaust gas headers, and switching cut-off valves disposed in the bypasses and the exhaust gas headers or the exhaust gas passages on the downstream sides of the exhaust gas headers.

The industrial furnace according to this invention is characterized by having disposed respectively in the bypasses such cut-off valves as are adapted to be a totally closed state normally and in the exhaust gas headers or in the exhaust gas passages on the downstream sides of the exhaust gas headers such cut-off valves as are adapted to be in a totally opened state, and control means for causing the cut-off valves in the bypasses to be fully opened and the cut-off valves in the exhaust gas headers or in the exhaust gas passages on the downstream sides of the exhaust gas headers to be totally closed in response to an electrical, hydraulic, or optical signal from burner monitoring means for monitoring the operating state of the rotary regenerative burners.

The oxidizing agent header parts of the industrial furnace according to this invention are characterized by being connected to a forced-draft fan for controlling the flow of an oxidizing agent by means of a damper and the opening degrees of the damper so as to keep the indicated value of oxygen concentration in the combustion chamber at a set level.

The burner monitoring means of the industrial furnace according to this invention is characterized by comprising at least one member selected from among a thermometer for measuring the exhaust gas temperature at the outlet of the regenerator, an ammeter for measuring electric current of the electric motor for driving the regenerator or the duct part, a rotating meter for measuring the revolution number, and a thermal relay operated with an overcurrent of the electric motor.

The combustion chamber of the industrial furnace according to this invention is characterized by having an exhaust gas outlet communicating therewith, a switching control valve disposed in the exhaust gas outlet, and pressure detecting means for detecting the inner pressure of the combustion chamber and the control means adapted to adjust the opening degree the control valve when the pressure detecting means finds the inner pressure to have exceeded a pre-set level.

The combustion chamber of the industrial furnace according to this invention is characterized by having an exhaust gas outlet communicating therewith, a switching control valve disposed in the exhaust gas outlet, and induced-draft fan monitoring means for detecting the ability of an induced-draft fan to aspirate the exhaust gas in the exhaust gas passage and the control means adapted to adjust the opening degree of the control valve when the induced-draft fan monitoring means finds the aspirating ability to have exceeded a pre-set level.

The combustion chamber of the industrial furnace according to this invention is characterized by having an exhaust gas outlet communicating therewith, a switching control valve disposed in the exhaust gas outlet, pressure detecting means for detecting the inner pressure of the combustion chamber, and induced-draft fan monitoring means for detecting the ability of an induced-draft fan to aspirate the exhaust gas in the exhaust gas passage, and the control means adapted to adjust the opening degree of the control valve when the pressure detecting means has found the inner pressure to have exceeded a pre-set level and the induced-draft fan monitoring means has found the aspirating ability to have exceeded a pre-set level.

In this invention, the cut-off valve in the bypass is opened to allow supply of the oxidizing agent at ambient temperature through not only the oxidizing agent passage in the rotary regenerative burner in trouble but also the exhaust gas passage when the burner monitoring means detects an emergency of the rotary regenerative burner. The supplied oxidizing agent so supplied cools the exhaust gas passage and the regenerator and, at the same time, mixes with the fuel being supplied into the furnace and ensures continuation of the combustion.

Since this combustion arises from the oxidizing agent at ambient temperature, the amount of the exhaust gas is increased by a proportion which corresponds to the sensible heat involved in the preheating of the oxidizing agent and this increase of the exhaust causes an increase in the inner pressure of the combustion chamber.

The control means is actuated to adjust the opening degree of the control valve inside the exhaust gas outlet, however, when the pressure detecting means detects a rise of the inner pressure of the combustion chamber above the preset level and/or the induced-draft fan monitoring means detects an increase of the aspirating ability of the induced-draft fan to the rated level. If the amount of the exhaust gas is increased, part of the exhaust gas is directly released through the exhaust gas outlet and the inner pressure of the combustion chamber is consequently lowered to below the pre-set level and/or the induced-draft fan is enabled to manifest the prescribed aspirating ability. As a result, the inner pressure of the combustion chamber is prevented from rising and the necessary supply of the oxidizing agent is secured.

When a plurality of such rotary regenerative burners are in normal operation, the load acting on these rotary regenerative burners or the load on the induced-draft fan is alleviated, the heat generation pattern required for the sake of the fluid being subjected to heating can be kept unaltered even after the industrial furnace has encountered a mechanical trouble, and the operational flexibility of the industrial furnace can be exalted.

In the case of an industrial furnace which is provided with a plurality of rotary regenerative burners, when the bypasses and the exhaust gas passages are each provided with an expensive cut-off valve, the passages are intricated to the extent of complicating the construction of the entire system and rendering the entire system expensive.

In the present invention, however, the construction of the industrial furnace can be simplified and the cost thereof reduced appreciably by having header parts adapted to serve collectively the exhaust gas passages and the oxidizing agent passages of the plurality of rotary regenerative burners, bypasses respectively connected to the header parts, and cut-off valves disposed in the exhaust gas headers or the exhaust gas passages on the downstream sides of the exhaust gas headers.

The means for detecting the operating state of the rotary regenerative burner may be a thermometer for detecting the temperature of the exhaust gas discharged from the rotary regenerative burner because the exhaust gas temperature is raised when smooth exchange of heat between the exhaust gas and the oxidizing agent ceases to exist, an ammeter for detecting the electric current of an electric motor for rotating the regenerator or the duct part or a thermal relay operating with an overcurrent of the electric motor because this electric current rises when the relative rotation between the regenerator and the duct part is stopped or lowered below a pre-set level by some cause, or a rotating meter capable of directly measuring the revolution number of the regenerator or the duct part. This detecting means permits detection of abnormality in the operating state of the rotary regenerative burner and enables the industrial furnace to operate with high responsivity and high accuracy.

DETAILED DESCRIPTION OF THE PREFERRED EMBODIMENT

Now, the embodiments of this invention will be described more specifically below with reference to the annexed drawings.

Figure 1:
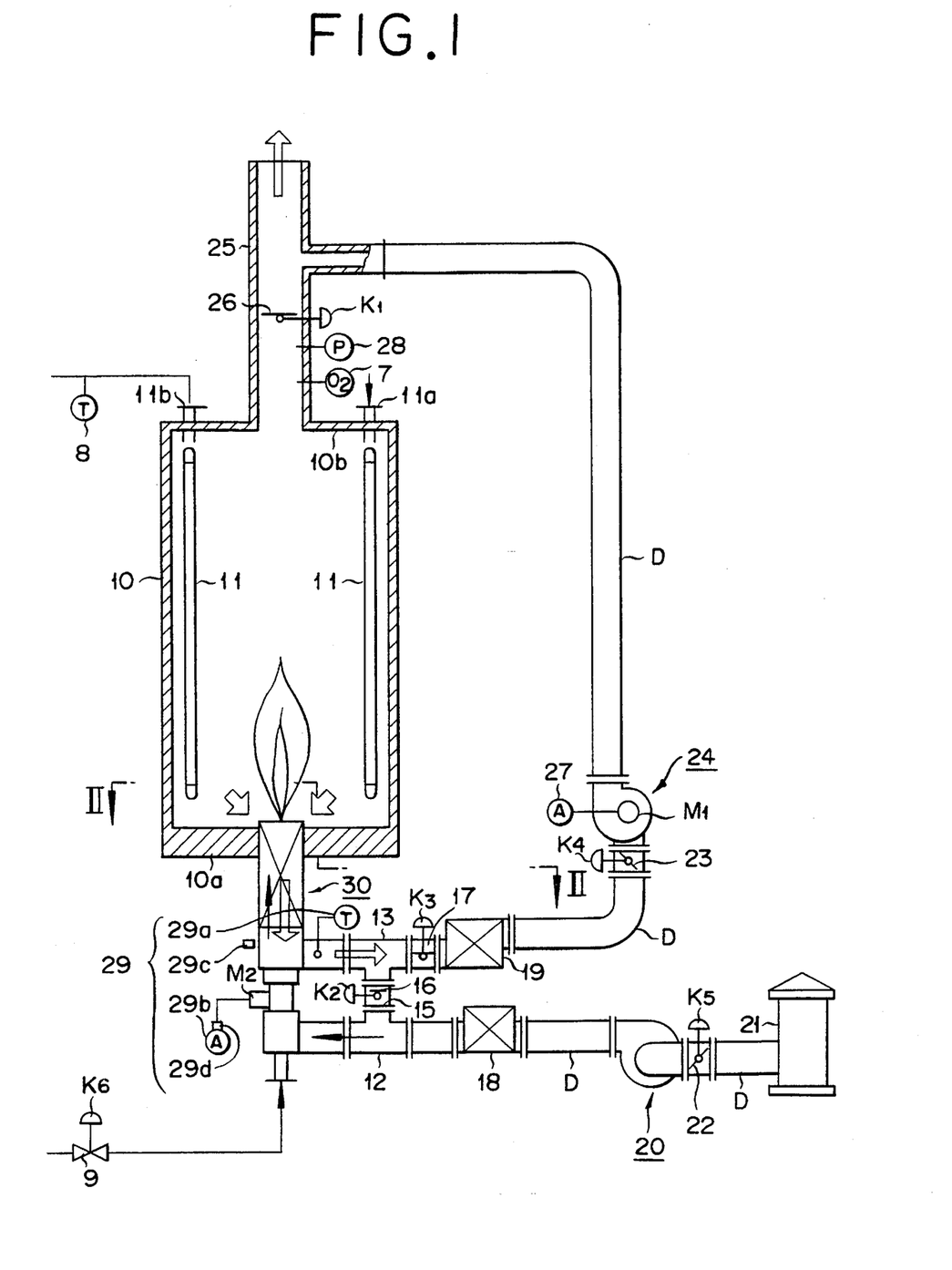
FIG. 1 is a schematic cross section illustrating a box-type pipestill heater as one embodiment of this invention.

A box-type pipestill heater illustrated in FIG. 1 is provided with a substantially enclosed combustion chamber 10 formed of a refractory material such as fire bricks. On a floor wall 10a of this combustion chamber 10, a plurality of rotary regenerative burners 30 are installed. In the combustion chamber 10, a multiplicity of heating tubes 11 are disposed upright. In the heating tubes 11, a fluid such as naphtha or gasoline is received via an inlet tube 11a, advanced zigzag inside the combustion chamber 10, heated with open fire, and released via an outlet pipe 11b.

The rotary regenerative burners 30 each have an oxidizing agent passage 12 for supplying an oxidizing agent and an exhaust gas passage 13 for discharging an exhaust gas connected thereto. A bypass 15 allows intercommunication between the oxidizing agent passage 12 and the exhaust gas passage 13. The bypass 15 has attached thereto a cut-off valve 16 adapted to be in a totally closed state normally and the exhaust gas passage 13 has attached thereto a cut-off valve 17 adapted to be a fully opened state normally. By the switching operation of these cut-off valves 16, 17, the oxidizing agent is supplied either exclusively through the oxidizing agent passage 12 or jointly through the oxidizing agent passage 12 and the exhaust gas passage 13.

Figure 2:
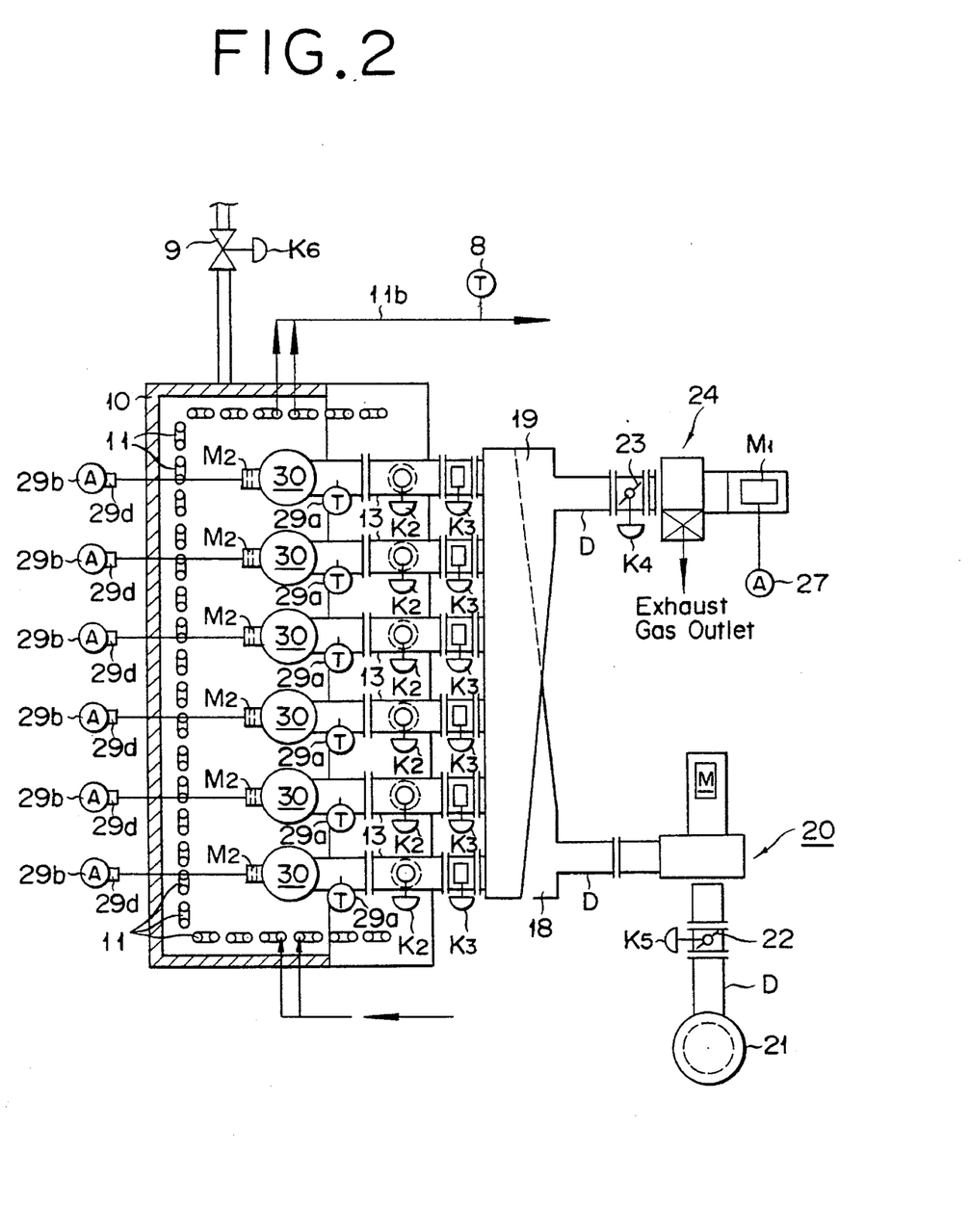
FIG. 2 is sectional-schematic view taken through FIG. 1 along the line II—II.

In the present embodiment, since six rotary regenerative burners 30 are installed in the combustion chamber 10 as clearly noted from FIG. 2, the number of the oxidizing agent passages 12 and the exhaust gas passage 13 connected to the burners 30 and the number of the bypasses 15 for allowing intercommunication therebetween are respectively six. The six oxidizing agent passages 12 are jointly bundled with an oxidizing header part 18 so as to permit collective supply of the oxidizing agent to the individual oxidizing agent passages 12 and the six exhaust gas passages 13 are jointly bundled with an exhaust gas header part 19 so as to permit collective discharge of the exhaust gas.

If the expensive cut-off valves 16, 17 are disposed in the exhaust gas passages 13 or in the bypasses 15, the construction of the entire system is complicated and the installation cost of the plant is increased.

Figure 3:
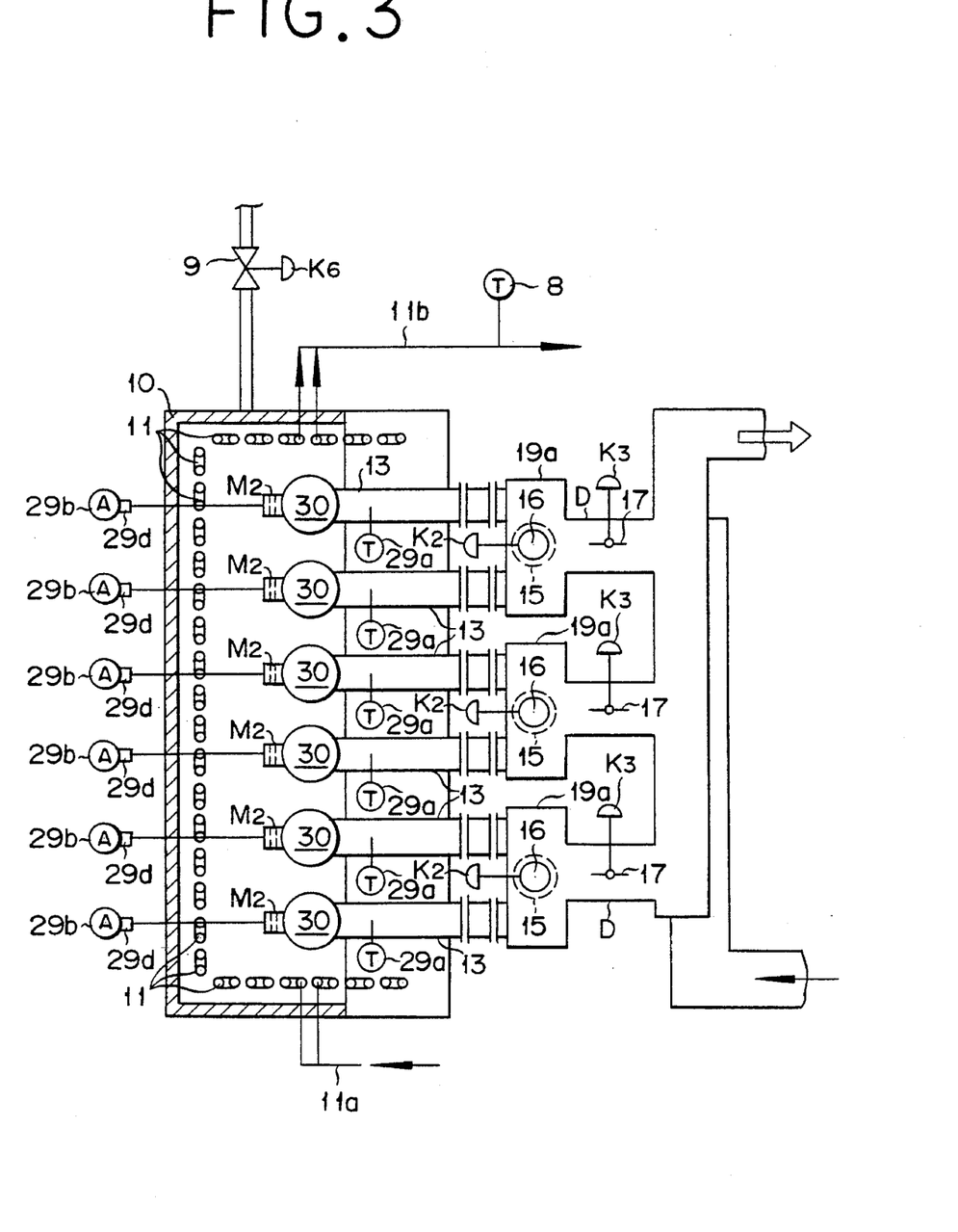
FIG. 3 is a sectional-shematic view of a modification of this invention corresponding to FIG. 2.
Figure 4:
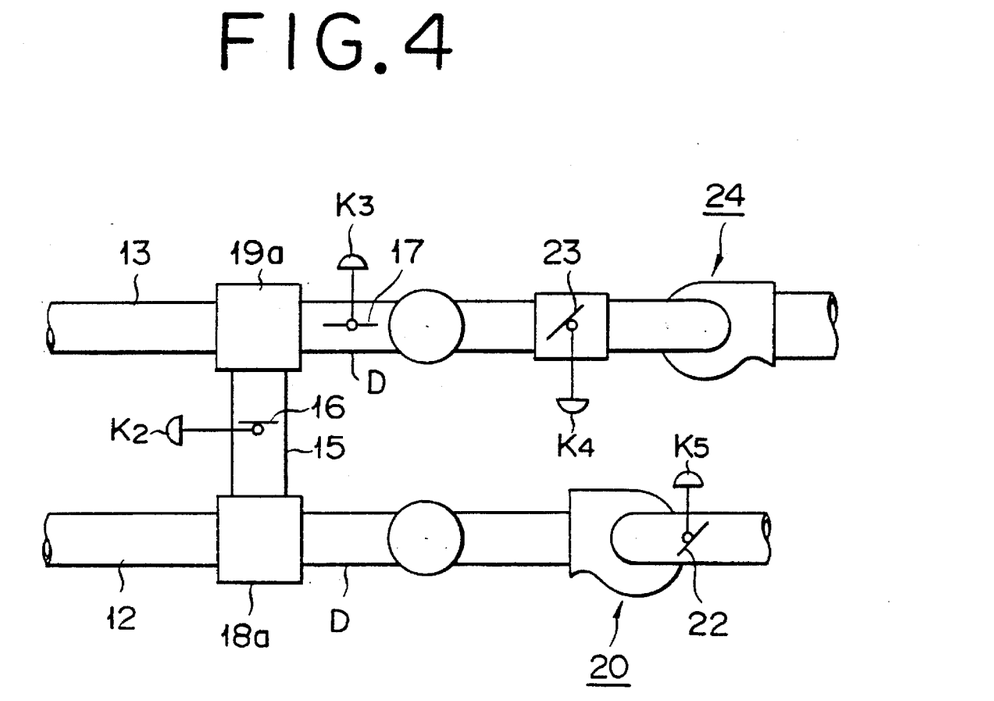
FIG. 4 is a side view illustrating the essential part of the modification of FIG. 3.

It is, therefore, preferable to construct this system as illustrated in FIG. 3 and FIG. 4. In this modification two oxidizing agent passages 12 or two exhaust gas passages 13 are jointly bundled with an oxidizing agent header part 18a or an exhaust gas header part 19a, a bypass 15 is used to allow intercommunication between the two header parts 18a, 19a, cut-off valves 17 are attached to the bypass 15 and the exhaust header part 19a or a duct D of the downstream side exhaust gas passage connected to the exhaust gas header part 19a. The number of the oxidizing agent passages 12 and that of the exhaust gas passages 13 both collected into one bundle do not need to be limited to two. Optionally, three or more oxidizing agent passages 12 or exhaust gas passages 13 may be jointly bundled with an oxidizing agent header part 18a or an exhaust gas header part 19a.

Figure 5:
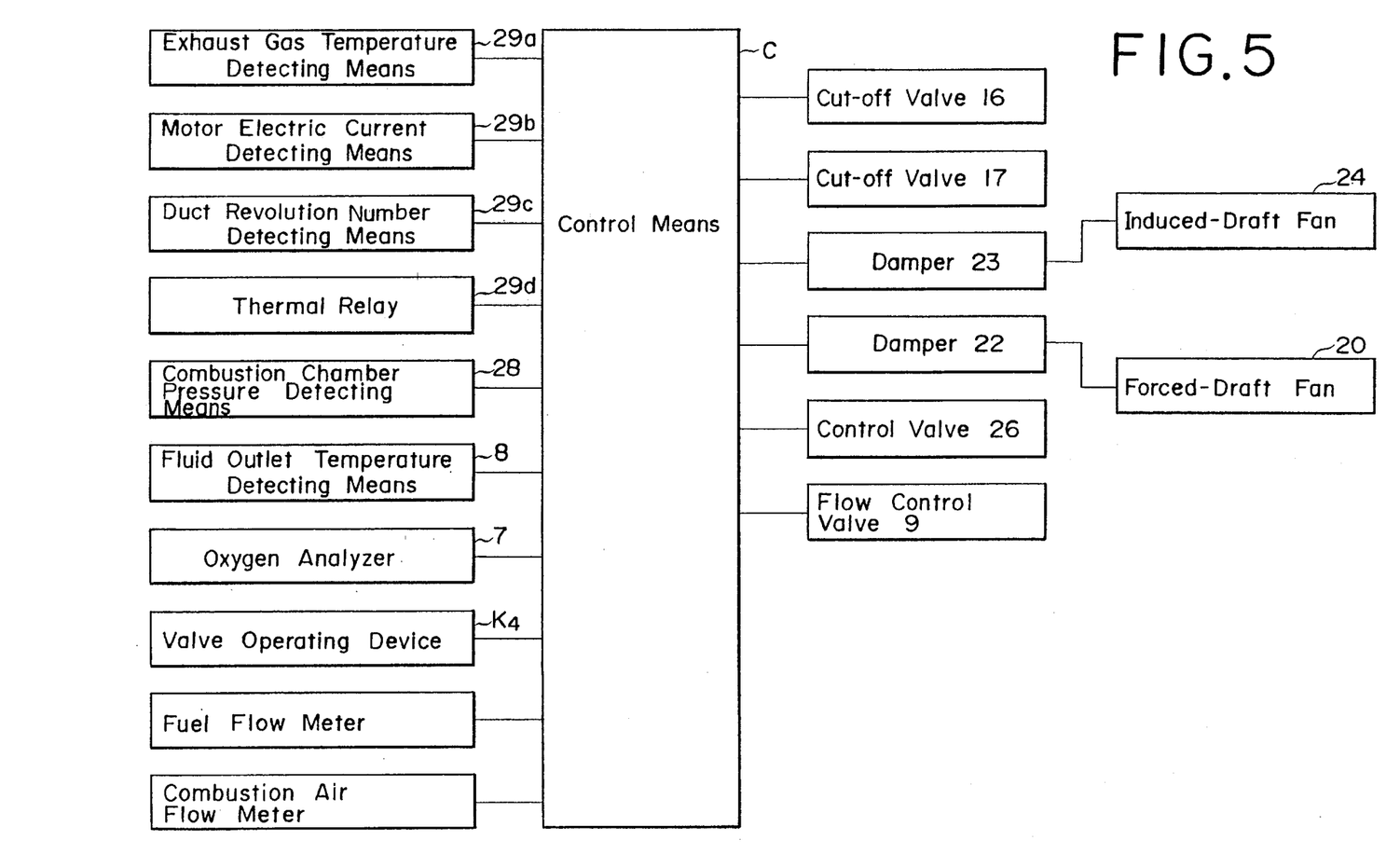
FIG. 5 is a block diagram illustrating a control system in the embodiment described above.

As illustrated in FIG. 2, a forced-draft fan 20 is connected via the duct D to the oxidizing agent header part 18. This forced-draft fan 20 is adapted for enabling the oxidizing agent to flow through a silencer 21 to be regulated in flow by a damper 22 and thereafter to be drawn into the forced-draft fan 20. In this forced-draft fan 20, the indicated value of an oxygen analyzer 7 (FIG. 1) for determining the oxygen concentration in the combustion chamber 10 is input into control means C as illustrated in FIG. 5 and the signal issued by the control means C in response to the input data controls the opening degree of the damper 22 so that the indicated value of the oxygen analyzer 7 will remain at a constant level.

The exhaust gas header part 19 is provided with an induced-draft fan 24 through the duct D and the damper 23. The exhaust gas from this induced-draft fan 24 is advanced through the duct D (FIG. 1) and discharged via an exhaust gas outlet 25 which is disposed contiguously to a roof wall 10b of the combustion chamber 10. In this exhaust gas outlet 25, a control valve 26 adapted to be a totally closed state normally is set in place. The opening degree of this control valve 26 is adjusted with a control signal from the control means C when pressure detecting means 28 formed such as of a pressure gauge for detecting the inner pressure of the combustion chamber 10 has detected an inner pressure exceeding a pre-set level and induced-draft fan monitoring means 27 for detecting the ability of the induced-draft fan 24 to aspirate the exhaust gas from within the exhaust gas passage 13 has detected an aspirating ability exceeding a pre-set level.

The induced-draft fan monitoring means 27 used herein is adapted to discern whether or not the ability of the induced-draft fan 24 has reached the rated level and protect this induced-draft fan 24 itself. In the present embodiment, the induced-draft fan monitoring means 27 forms a judgment to decide whether or not the ability of the induced-draft fan 24 has reached the rated level based on the electric current of an electric motor M1 for driving the induced-draft fan 24 and the output of a valve operating device K4 for operating of the control valve 23 and protects the induced-draft fan 24. To be more specific, the electric current of the electric motor M1 is detected by an ammeter and the output of the valve operating device K4 for controlling the control valve 23 is obtained in the form of manipulated variable of value, for example. The indicated value of the induced-draft fan monitoring means 27 is input into the control means C as illustrated in FIG. 5. When the electric current has reached the pre-set level, the control valve 23 is controlled by the fact that the valve operating device K4 of the control valve 23 such as, a pneumatically operated piston has the air pressure thereof adjusted by the signal issued from the control means C.

The present embodiment is also provided with burner monitoring means 29 which monitors the operating state of the rotary regenerative burner 30 and finds whether or not the operating state is normal. This burner monitoring means 29 comprises temperature detecting means 29a formed such as of a thermocouple for measuring the temperature of the exhaust gas in the outlet part of the regenerator of the rotary regenerative burner 30 which will be described specifically afterward, electric current detecting means 29b formed such as of an ammeter for measuring the electric current of an electric motor for driving the regenerator or the duct, revolution number detecting means 29c formed such as of a rotation meter for measuring the revolution number of the regenerator or the duct part, and a thermal relay 29d in a motor control circuit and operated with an overcurrent. Optionally, this burner monitoring means 29 may comprise at least one member selected from among the temperature detecting means 29a, the current detecting means 29b, the revolution number detecting means 29e, and the thermal relay 29d.

In the rotary regenerative burner with a mechanical trouble, the amount of radiative heat transfer to the heating tubes 11 is decreased from the normal level by a portion due to the incomplete exchange of heat between the exhaust gas and the oxidizing agent and the outlet temperature of the fluid subjected to heating is proportionately lowered. To adjust this temperature drop, the heating tube 11 is provided at the outlet part thereof with a thermometer 8 formed such as of a thermocouple and the indicated value of this thermometer 8 is input into the control means C. When the indicated value falls below a pre-set temperature, the control means C outputs a signal for adjusting the valve opening degree to a flow control valve 9 so as to increase the amount of fuel.

In FIG. 5, the signals from the fuel flow meter and the combustion air flow meter which are not shown in FIG. 1 are illustrated as input signals to the control means C. They are means of control which are used for enabling the operation to proceed at a slight excess supply of air during a change of load which necessitates a generous increase or decrease of fuel on account of the relation between the set value and the indicated value of the output temperature of the fluid subjected to heating. They are well known in the art and call for no further description.

In the diagram, the alphanumeric symbols "K2 to K6" invariably denote valve operating devices.

Figure 6:
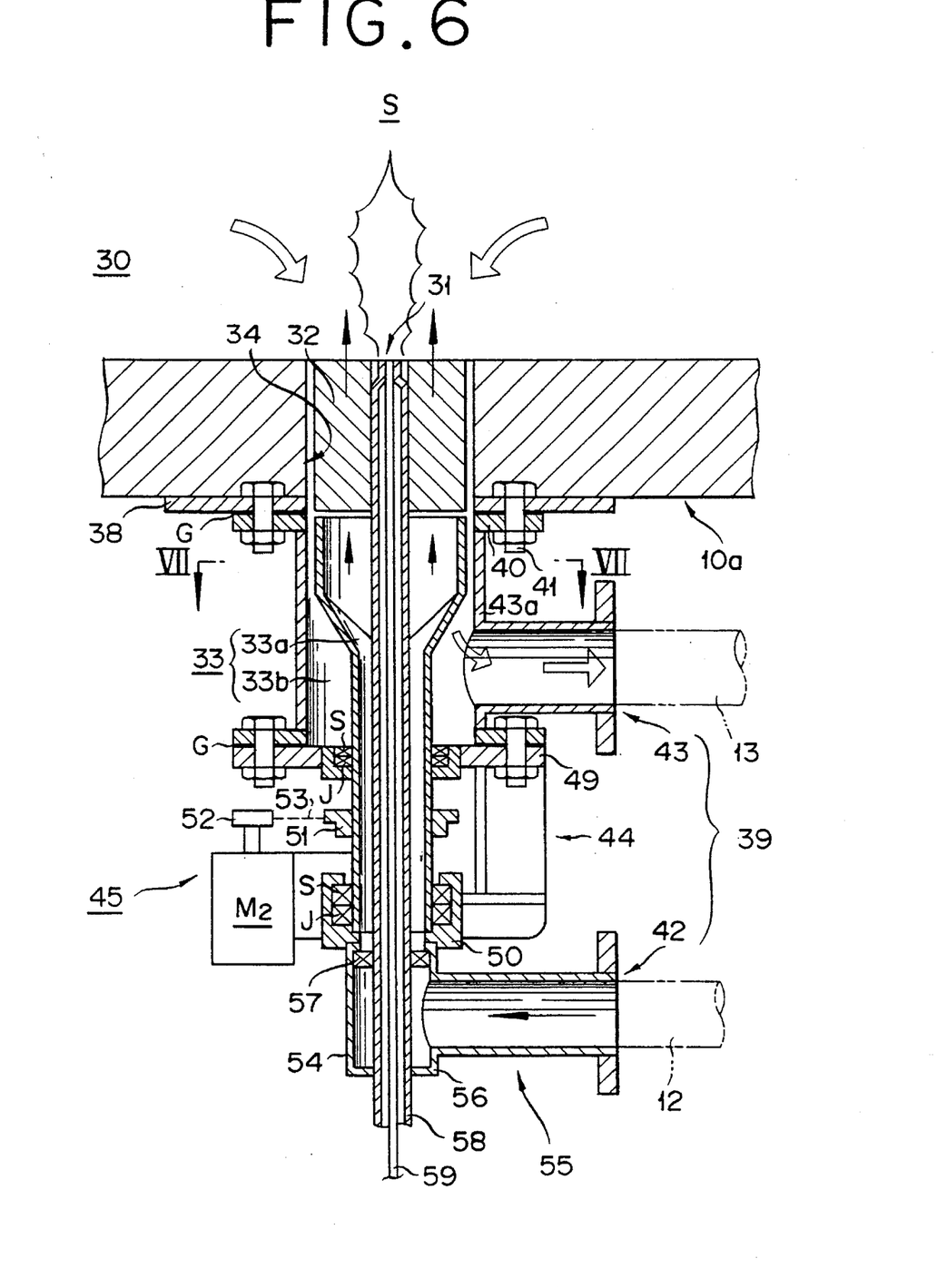
FIG. 6 is a schematic cross section illustrating one example of the rotary regenerative burner of the embodiment described above.

The rotary regenerative burner 30, as illustrated in FIG. 6, is composed of a burner 31 adapted to spout a flame in the upward direction, a regenerator 32 adapted to function as a heat-exchange member attached to the floor wall 10a of the combustion chamber 10, a duct part 33, etc.

The regenerator 32 is, for example, formed of a ceramic material containing a multiplicity of holes in the form of a honeycomb and is installed as firmly set in an opening portion 34 which is formed in the floor wall 10a of the combustion chamber 10.

On the side of the regenerator 32 opposite to the combustion chamber, the duct part 33 having formed therein an oxidizing agent duct 33a for supplying the oxidizing agent and an exhaust gas duct 33b for discharging the exhaust gas resulting from the combustion inside the combustion chamber 10 is disposed so as to communicate with the regenerator 32.

The burner 31 disposed at the center of the regenerator 32 is an ordinary gas burner or oil burner and has the leading end thereof confront the interior of the combustion chamber 10. The oxidizing agent, therefore, is received from the oxidizing agent passage 12 through the oxidizing agent duct 33a formed in the duct part 33, forwarded through the regenerator 32 disposed so as to enclose around the burner 31, and spouted through the periphery of the burner 31.

A plate 38 for supporting the burner 31 is disposed on the outer edge of the opening portion 34. To this plate 38, a flange 40 of a burner body case 39 is joined with bolts 41 through a gasket G so that the burner body case 39 communicates with the regenerator 32.

The burner body case 39 is adapted to cover the duct part 33 from outside and is provided with an inlet portion 42 for receiving the oxidizing agent from the oxidizing agent passage 12, an outlet part 43 for discharging the exhaust gas into the exhaust gas passage 13, an intermediate portion 44 interposed between the inlet portion 42 and the regenerator 32, and a drive portion 45 for rotating the duct part 33.

Figure 7:
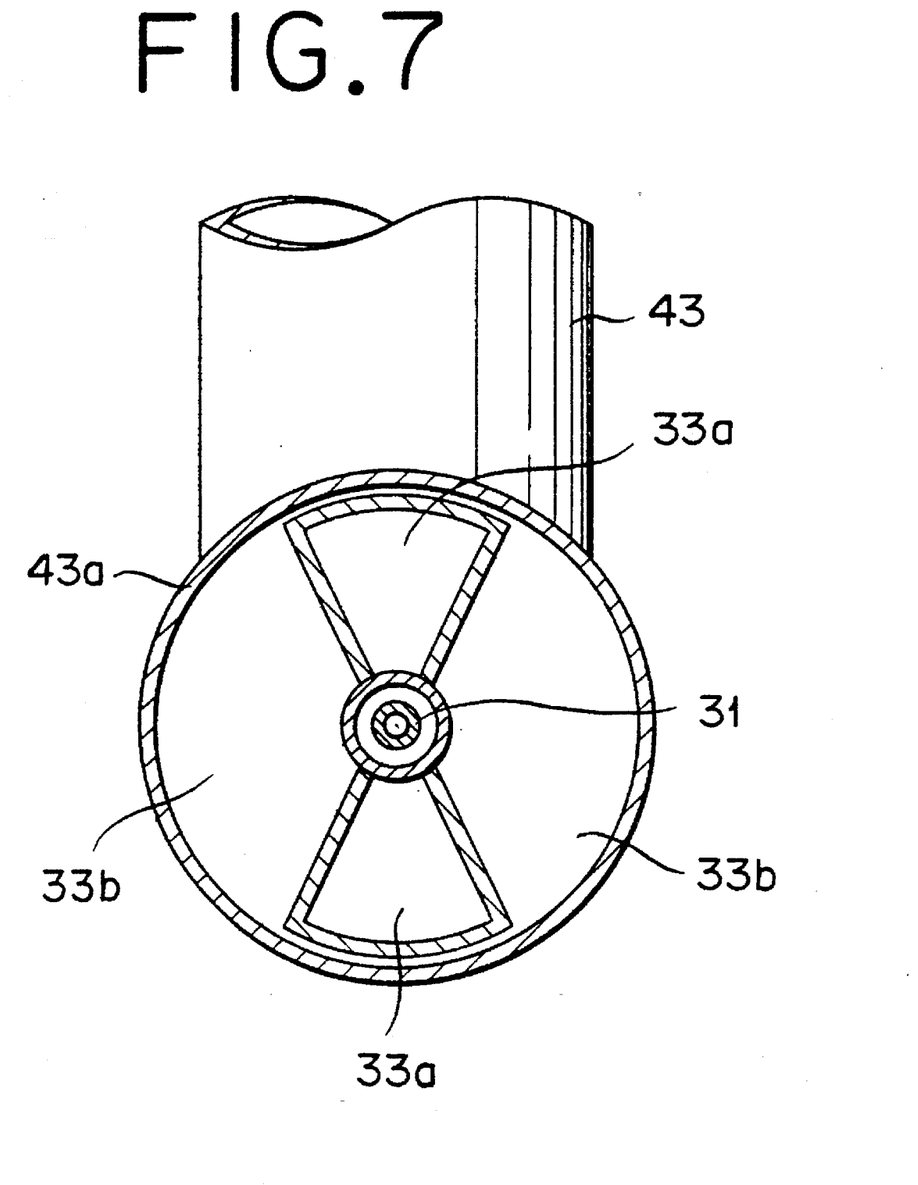
FIG. 7 is a cross section taken through FIG. 6 along the line VII—VII.

The large-diameter division of the duct part 33 is disposed in a barrel portion 43a of the outlet part 43. The large-diameter division forms a part of the oxidizing agent duct 33a and has a cross section of the shape of a fan opened in an acute angle as illustrated in FIG. 7. In the barrel portion 43a, the oxidizing agent duct 33a and the exhaust gas duct 33b are disposed so as to be alternately positioned in the circumferential direction. The oxidizing agent duct 33a and the exhaust gas duct 33b are so formed as to constitute mutually independent conduits throughout the entire length from the inlet to the outlet.

The intermediate portion 44 mentioned above is provided with an block plate 49 disposed so as to block the terminal part of the barrel portion 43a opposite to the regenerator in the outlet part 43 and a supporting plate 50 disposed in the lower end of the duct part 33.

The said drive portion 45 is obtained by interlocking a sprocket 51 fixed between bearings J, J and a drive gear 52 rotated with a motor M2 through a chain 53 so as to rotate the duct part 33 which is rotatably supported by a seal member S and a bearing J disposed respectively on the inner end part of the block plate 49 and the supporting plate 50. The duct part 33 can be rotated at a relative high speed because it is supported as ideally balanced by the two bearings J, J.

The inlet portion 42 is obtained by joining a base tube 54 and a branch tube 55 in the shape of the letter T. One end of the base tube 54 is closed with a lid member 56 and the other end thereof is attached to the supporting plate 50 which is provided at the end part of the duct part 33. The reference numeral "57" used in FIG. 6 stands for a straightening plate.

Now, the operation of the present embodiment will be described below.

First, during the normal operation of the industrial furnace, since the cut-off valve 17 in the exhaust gas passage 13 of each of the rotary regenerative burners 30 is in a totally opened state and the cut-off valve 15 in the bypass 16 is in a totally closed state, the streams of the exhaust gas in the rotary regenerative burners 30 (open arrow marks) are passed through the exhaust gas passages 13, collected in the exhaust gas header part 19, forced by the induced-draft fan 24 into the exhaust gas outlet 25 on the downstream side of the control valve 26, and discharged into the ambient air.

In the meanwhile, the streams of the oxidizing agent (full arrow marks) are pressurized by the forced-draft fan 20, forwarded via the oxidizing agent header part 18 into the oxidizing agent passages 12, preheated by the rotary regenerative burners 30, and introduced into the combustion chamber 10. At this time, the possibility of the oxidizing agent mingling with the exhaust gas is nil because the cut-off valve 16 in the bypass 15 is in a totally closed state.

When the thermometer 29a in the exhaust gas passage 13, the ammeter 29b of the electric motor M2 for rotating the rotary regenerative burner 30, or the thermal relay 29d detects an emergency, the cut-off valve 17 in the exhaust gas passage 13 of the rotary regenerative burner 30 with the emergency is to be a totally closed state and the cut-off valve 16 in the bypass 15 is to be a totally opened state. As a result, part of the oxidizing agent currently flowing through the oxidizing agent passage 12 is forwarded through the bypass 15 and, together with the part of the oxidizing agent flowing through the exhaust gas passage 13, supplied to the regenerative burner 30. Thus, the possibility of the hot exhaust gas of combustion continuously flowing through the regenerator 32 and the induced-draft fan 24 and inflicting damage on these devices can be precluded. Even the rotary regenerative burner 30 with a mechanical trouble, therefore, can continue combustion.

In the present pipestill heater, the flow control valve 9 controls the pressure or flow of the combustion gas or combustion oil so as to keep the outlet temperature of the fluid subjected to heating at a pre-set level. In the induced-draft ,fan 24, the suction side damper 23 of the induced-draft fan 24 is controlled so as to keep the indicated value of the pressure gauge 28 of the combustion chamber 10 at a pre-set level. Then the suction side damper 22 of the forced-draft fan 20 is controlled so as to keep the indicated value of the oxygen analyzer 7 of the combustion chamber 10 at a pre-set level.

When any of the rotary regenerative burners 30 in operation happens to encounter a mechanical trouble, the amount of radiative heat transfer to the heating tubes 11 is decreased from the normal level by a portion due to the incomplete exchange of heat between the exhaust gas and the oxidizing agent and the outlet temperature of the fluid subjected to heating is proportionately lowered.

To adjust the temperature, the flow control valve 9 is actuated to increase the amount of fuel by the signal from the control means C. The inner pressure of the combustion chamber 10 is increased, the amount of the oxidizing agent allowed to flow in is decreased, and the oxygen concentration in the combustion chamber 10 is decreased proportionately to the increase in the amount of combustion.

To adjust this situation, the dampers 23 and 22 respectively of the induced-draft fan 24 and the forced-draft fan 20 are opened. When the forced-draft fan 20 and the induced-draft fan 24 are compared in terms of load, since the oxidizing agent flows into all the rotary regenerative burners 30, whereas the exhaust gas is not discharged from the rotary regenerative burner 30 with a mechanical trouble but is discharged only from the normally operating rotary regenerative burners, the rising ratio of the pressure drop on the exhaust gas side increases and the load on the induced-draft fan 24 first approaches the rated level.

The continuation of the operation, therefore, can be attained by detecting the approach of the load of the induced-draft fan 24 to the rated level and keeping the control valve 26 in the exhaust gas outlet 25 open until the inner pressure of the furnace falls below the pre-set level.

If the rotary regenerative burner 30 with a mechanical trouble is turned off and the load thereof is diverted to the other rotary regenerative burner 30 in normal operation, the amount of combustion of the normally operating rotary regenerative burner 30 is increased and the amount of heat absorption in the heating tubes 11 located nearby this rotary regenerative burner 30 is also increased. In the pipestill heater which generally handles hydrocarbons as a fluid subjected to heating, such local elevation of temperature as this case has the possibility of forcing the fluid to be decomposed, degenerated, or converted into coke. Since the phenomenon of coking forms an important object of abhorrence in the field of pipestill heaters, any protracted suspension of the use of the burner which possibly entails local heating must be avoided. Also from this point of view, the present apparatus which permits even the rotary regenerative burner in trouble to continue combustion proves highly effective in maintaining uniform heating.

This invention does not need to be limited to the embodiment described and illustrated above but may be variously modified and otherwise practiced within the scope of claims for patent of the invention to be set forth hereinbelow. The embodiment cited above represents a case of adapting the oxidizing agent passage 33a of the duct part for rotary operation. Optionally, the regenerator 30 may be adapted for rotary operation. In short, the rotation may be generated in a relative manner between the regenerator and the passage for the incoming fluid. The embodiment contemplates providing a plurality of rotary regenerative burners in one combustion chamber. It is, of course, permissible to provide one rotary regenerative burner in one combustion chamber. The embodiment further contemplates using a ceramic refractory material for the regenerator in the rotary regenerative burner. Alternatively, the regenerator may be formed of a metallic material.

We claim:

1. In an industrial furnace having disposed on the wall of a combustion chamber at least one rotary regenerative burner comprising a gas permeable regenerator and a duct part communicating with said regenerator of each rotary regenerative burner, and having formed therein an oxidizing agent duct, for passing an oxidizing agent and an exhaust gas duct for passing the exhaust gas from said combustion chamber and adapted to heat said oxidizing agent with the heat of said exhaust gas through said each regenerator while rotating said each regenerator, and said each duct part relative to each other, the improvement being in that said industrial furnace is provided with a bypass allowing inter communication between an oxidizing agent passage communicating with said each oxidizing agent duct, an exhaust gas passage communicating with said each exhaust gas duct, and said bypass and said exhaust gas passage having switching cut-off valves disposed therein.

2. An industrial furnace according to claim 1, including burner monitoring means, and said combustion chamber having disposed in said bypass a cut-off valve adapted to be a totally closed state normally and a fully opened state in response to a signal from said burner monitoring means for monitoring the operating state of said rotary regenerative burner and has disposed in said exhaust gas passage a cut-off valve adapted to remain in a totally closed state normally and a totally closed state in response to said signal.

3. An industrial furnace according to claim 2, wherein said burner monitoring means comprise at least one member selected from among a thermometer for measuring the exhaust gas temperature at the outlet of said regenerator, an ammeter for measuring the electric current of the electric motor for driving said duct part or said regenerator, a thermal relay operated with an overcurrent and a rotating meter for measuring the revolution number of said regenerator or said duct part.

4. An industrial furnace according to claim 2, wherein said combustion chamber comprises an exhaust gas outlet communicating therewith, a control valve disposed in said exhaust gas outlet and adapted to be a totally closed state normally, and pressure detecting means for detecting the inner pressure of said combustion chamber and the control means adapted to adjust the opening degree, when detecting an inner pressure exceeding a pre-set level when the pressure detecting means detects an inner pressure exceeding a pre-set level.

5. An industrial furnace according to claim 2, wherein said combustion chamber comprises an exhaust gas outlet communicating therewith, a switching control valve disposed in said exhaust gas outlet and adapted to be a totally closed state normally, and fan monitoring means for detecting the ability of an induced-draft fan to aspirate the exhaust gas in said exhaust gas passage and the control means adapted to adjust the opening degree of said control valve, when the fan monitoring means detects an aspirating ability exceeding a pre-set level.

6. An industrial furnace according to claim 2, wherein said combustion chamber comprises an exhaust gas outlet communicating therewith, a control valve disposed in said control valve, pressure detecting means for detecting the inner pressure of said combustion chamber and fan monitoring means for detecting the ability of an induced-draft fan to aspirate the exhaust gas in said exhaust gas passage, and the control means adapted to adjust the opening degree of said control valve when the pressure detecting means has detected an inner pressure exceeding a pre-set level and said induced-draft fan monitoring means has detected an aspirating ability exceeding a pre-set level.

7. An industrial furnace according to claim 2, wherein said signal is an electrical signal.

8. An industrial furnace according to claim 2, wherein said signal is a hydraulic signal.

9. An industrial furnace according to claim 2, wherein said signal is an optical signal.

10. An industrial furnace according to claim 1, wherein said oxidizing agent passage is connected to an induced-draft fan for controlling the flow of said oxidizing agent by means of a damper and the opening degree of said damper so that the indicated value of the oxygen concentration in said combustion chamber will remain at a fixed level.

11. An industrial furnace according to claim 1, wherein said combustion chamber is provided with a plurality of rotary regenerative burners, oxidizing agent header parts connected to a suitable number of divisions of the oxidizing agent passages connected respectively to said rotary regenerative burners for effecting collective supply of an oxidizing agent to said rotary regenerative burners, exhaust gas headers connected to a suitable number of divisions of the exhaust gas passages for discharging the exhaust gas departing from said rotary regenerative burners, bypasses for intercommunicating between said oxidizing agent header parts and said exhaust gas headers, and switching cut-off valves disposed in said bypasses and said exhaust gas headers or said exhaust gas passages on the downstream sides of said exhaust gas headers.

12. An industrial furnace according to claim 11, including burner monitoring means, said bypasses each having disposed therein a cut-off valve adapted to be a totally closed state normally, one of said exhaust gas headers and said exhaust gas passages on the downstream sides of said exhaust gas headers having disposed therein a cut-off valve adapted to be a fully opened state, ad said cut-off valves are controlled by control means in response to a signal from said burner monitoring means for detecting the operating state of said rotary regenerative burners so as to cause said cut-off valves on said bypass side to be a fully opened state and said cut-off valves in said exhaust gas headers or said exhaust gas passage on downstream side of said exhaust gas headers to be a totally closed state.

13. An industrial furnace according to claim 11, wherein said oxidizing agent header parts are connected to forced-draft fans for controlling the flow of an oxidizing agent by means of a damper and the opening degrees of said dampers so as to keep the indicated value of oxygen concentration in said combustion chamber at a pre-set level.

14. An industrial furnace according to claim 12, wherein said burner monitoring means comprise at least one member selected from among a thermometer for measuring the exhaust gas temperature at the outlet of said regenerator, an ammeter for measuring the electric current of the electric motor for driving said duct part or said regenerator, a thermal relay operated with an overcurrent and a rotating meter for measuring the revolution number of said regenerator or said duct part.

15. An industrial furnace according to claim 12, wherein said combustion chamber comprises an exhaust gas outlet communicating therewith, a control valve disposed in said exhaust gas outlet and adapted to be a totally closed state normally, and pressure detecting means for detecting the inner pressure of said combustion chamber and the control means adapted to adjust the opening degree, when detecting an inner pressure exceeding a pre-set level when the pressure detecting means detects an inner pressure exceeding a pre-set level.

16. An industrial furnace according to claim 12, wherein said combustion chamber comprises an exhaust gas outlet communicating therewith, a switching control valve disposed in said exhaust gas outlet and adapted to be a totally closed state normally, and fan monitoring means for detecting the ability of an induced-draft fan to aspirate the exhaust gas in said exhaust gas passage and the control means adapted to adjust the opening degree of said control valve, when the fan monitoring means detects an aspirating ability exceeding a pre-set level.

17. An industrial furnace according to claim 12, wherein said combustion chamber comprises an exhaust gas outlet communicating therewith, a control valve disposed in said control valve, pressure detecting means for detecting the inner pressure of said combustion chamber and fan monitoring means for detecting the ability of an induced-draft fan to aspirate the exhaust gas in said exhaust gas passage, and the control means adapted to adjust the opening degree of said control valve when the pressure detecting means has detected an inner pressure exceeding a pre-set level and said induced-draft fan monitoring means has detected an aspirating ability exceeding a pre-set level.

18. An industrial furnace according to claim 5, wherein said signal is an electrical signal.

19. An industrial furnace according to claim 5 wherein said signal is a hydraulic signal.

20. An industrial furnace according to claim 5, wherein said signal is an optical signal.

* * * * *

UNITED STATES PATENT AND TRADEMARK OFFICE
CERTIFICATE OF CORRECTION

PATENT NO. : 5,490,776
DATED : February 13, 1996
INVENTOR(S) : H. Miyama, et al.

It is certified that error appears in the above-indentified patent and that said Letters Patent is hereby corrected as shown below:

On the title page, item [73] should read as follows:
--Assignee: Chiyoda Corporation and Furnace Techno Co., Ltd.--

Signed and Sealed this

Second Day of September, 1997

*Attest:*

BRUCE LEHMAN

*Attesting Officer*  *Commissioner of Patents and Trademarks*